July 13, 1965  R. B. KOCH  3,194,669
CONDITION RESPONSIVE DEVICES
Filed Dec. 26, 1961

INVENTOR.
ROBERT B. KOCH
BY
ATTORNEY

# United States Patent Office 3,194,669
Patented July 13, 1965

3,194,669
CONDITION RESPONSIVE DEVICES
Robert B. Koch, Hopkins, Minn., assignor to
Honeywell Inc., a corporation of Delaware
Filed Dec. 26, 1961, Ser. No. 162,086
3 Claims. (Cl. 99—192)

The present invention is directed to a device for use in indicating whether an article has gone through a freezing and thawing cycle. That is, the present invention is useful as an indicator for revealing that an article has been frozen, or for indicating that a substance once frozen has, at some period in its history, been thawed.

The need for such an indicator is present in many areas. As an example of a use for the device of the present invention as a freeze indicator, there is blood storage or the storage of certain foods and drugs which are adversely affected by freezing. An indicator is needed which will irreversibly indicate that these substances have been frozen, and therefore, are no longer suitable for their intended use.

As an example of the use of the present invention as a thaw indicator, there is the frozen food industry. As is well known, most foods lose quality if they are frozen, thawed, and then refrozen. The present invention provides a cheap, reliable device insofar as indication of the passing through a given temperature.

The device of the present invention is an improvement over the system described in a patent to Fenity et al. entitled "Thaw Indicator" No. 2,955,942 assigned to the same assignee as the present invention. In the Fenity invention, use is made of the property of a gel having its gel structure destroyed by freezing. The Fenity et al. teaching proposes to form an identifiable shape from a gel substance, in particular silica gel, so that upon subsequent freezing and thawing the gel structure is destroyed during the freezing cycle and the gel upon thawing loses its intricate shape and irreversibly indicates that a freezing and subsequent thawing cycle has taken place.

While this system does provide a freeze or thaw indicator, it has certain drawbacks. Principally, the device has an inherent shock sensitivity which is undesirable in certain types of applications. That is, the gel structure formed in an intricate shape could potentially be altered from its original form while in the still unfrozen condition by severe shock loading.

The present invention overcomes this problem as will be herein described.

The invention can best be understood with relation to the accompanying drawings.

Figure 1:
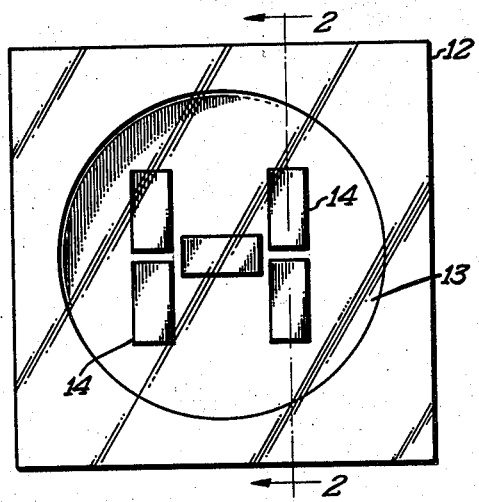
FIGURE 1 shows one modification of a device in accordance with the present invention.
Figure 2:
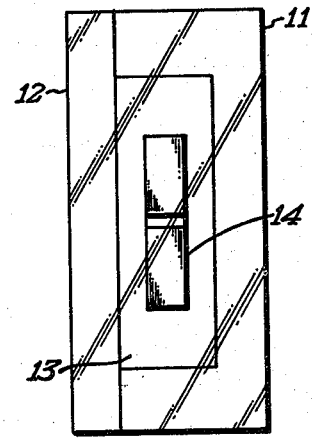
FIGURE 2 shows the device of FIGURE 1 in cross-section.
Figure 3:
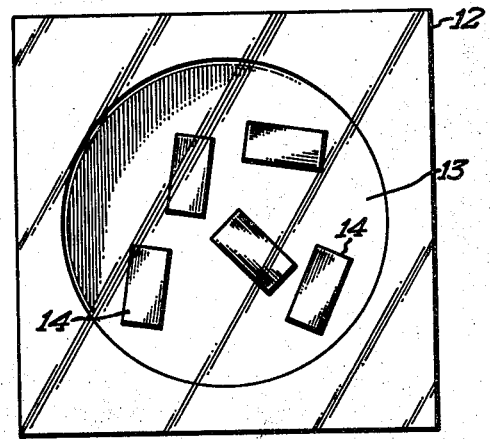
FIGURE 3 shows a device made in accordance with FIGURE 1 after alternate freezing and thawing.

FIGURE 1 and its cross-section in FIGURE 2 shows a container of plastic or other translucent or transparent material defining a watertight cavity therein. Contained within the plastic member 11 and transparent cover 12 is a cavity 13 containing a number of plastic or other material members generally designated 14 positioned so as to form a specific shape. In the example of FIGURE 1, this shape is in the form of an H. Substantially encapsulating the H is a gel material characterized in that its gel structure is destroyed, or substantially so, upon freezing. Until the gel substance is frozen, the segmented members defining the letter H are in effect bound in their particular location. The device being substantially filled with the gel so encases the individual members 14 and is so restrained by the dimensions of the cavity as to be essentially shockproof.

Figure 4:
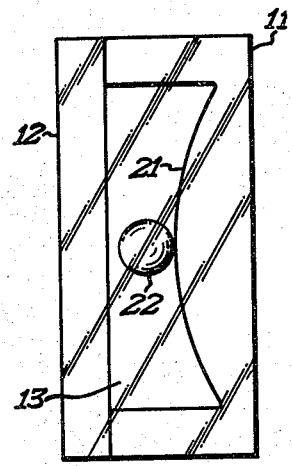
FIGURE 4 illustrates one alternative form of the present invention.

As an alternative form of the present invention, there is shown in FIGURE 4 in cross-section a device generally in accordance with that of FIGURE 1. However, in this modification the cavity has a domed portion 21 projecting into the cavity and located at the apex of the dome is a sphere 22 of a material preferably of greater specific gravity than the gel material. This device operates as indicated above; that is, the sphere 22 is held in central location by the gel in unfrozen condition or while frozen. Upon freezing the gel structure is destroyed and on subsequent thawing the sphere 22 no longer will be centrally located, thus providing the desired indication.

When the gel substance undergoes a freezing, the cell structure thereof is substantially destroyed. Of course, while in the frozen condition the individual members 14 are still restrained in their original position. However, upon thawing the gel structure, which has been substantially destroyed, no longer restrains the members 14 and these members are then free to migrate and thereby in effect destroy the original identifying mark. These members may be selected from materials which are of approximately the same density as the silica gel. One example, but by no means a limiting one, is polyethylene. In this event they will freely "float" about the interior of the device and thus be particularly sensitive to a loss of the gel structure. Either the gel or the members 14 may be appropriately colored to provide a marked contrast. It can be readily seen that this device can be utilized either as a freeze indicator or as a thaw indicator. Until the silica gel material is actually frozen, the gel structure is retained and the members are closely held by the gel structure. If the gel once undergoes a freezing and subsequent thawing, the members are no longer so constrained and can move about thus indicating it has gone through the freezing and thawing cycle. Similarly, the device may be used as a thaw indicator of an article which has once been frozen. In this event the operation is essentially the same as that previously defined; that is, the individual members 14 are bound in position by the frozen gel until such time as the gel thaws thus releasing the members 14 to move about at will.

The following example is one form of the present invention, although it should not be construed to be a limiting form. The form produced hereinbelow is the preferred form utilizing silica gel. Other modifications of the physical structure of the freeze or thaw indicator will readily suggest themselves to those skilled in the art.

*Example I*

A mixture of commercial sodium silicate ($SiO_2/Na_2O = 3.25$; density 40–42 Bé.)

and water is prepared where the sodium silicate comprises from 6% to 8% by volume of the water. Higher concentrations of sodium silicate may be used although the freezing point of the gel is depressed somewhat.

To the above mixture of sodium silicate, water is added and a quantity of concentrated (37% by weight) hydrochloric acid. The amount of hydrochloric acid should be equivalent to about 2% by volume. This quantity will vary somewhat in accordance with the sodium silicate concentration. The hydrochloric acid should be added with rapid stirring. Gelation occurs quite rapidly subsequent to agitation. This material is then cast into a cavity in a plastic member as illustrated in FIGURE 1; the plastic member cavity containing a number of individual segments of a plastic material arranged to form an intricate shape. Of course, the individual members identified 14 in FIGURE 1 will have to be constrained during the period in which actual gelation takes place. The cavity is filled essentially level with the surface and a transparent member identified 12 in FIGURE 2 is then placed across the surface of the gel-intricate shaped pieces and sealed by heat sealing or other suitable sealing methods. When a material such as butyl acetate is used as the plastic member, it may be heat sealed. Alternatively, materials of other types may be used and various sealing techniques may also be used.

Various modifications of this basic system will suggest themselves to those skilled in the art. For example, the freezing point of the interstitial water contained within the gel may be varied by appropriate additions of freezing point depressants. In this regard, materials such as the glycols or various quantities of salts may be included within the water used to form the gel. These will depress the freezing point to the desired temperature.

It has been found that the time required to produce gelation can be varied either by variation of the concentration of acid or by the use of acids of varying dissociation constant. For example, citric acid may be used rather than hydrochloric acid as in the above example. Gelation occurs more slowly than with hydrochloric. Likewise, oxalic acid may be used; this acid producing gelation at a rate faster than citric acid, but slower than hydrochloric acid. This change in rate may be advantageously employed in production of devices of the present invention where it is desirable to prepare large batches of the gel for use in filling devices over more prolonged periods of time.

*Example II*

The silica gel is prepared in the same manner as described with the exception of the inclusion of a small quantity of silver iodide to the sodium silicate-water mixture. I have found that a pronounced tendency exists in the gel mass for supercooling of the liquid portion. That is, the water tends to supercool to below its freezing point, thus necessitating the use of lower temperatures to freeze and/or longer times at a given temperature for freezing. The addition of the silver iodide provides nuclei for crystallization to occur upon and thus reduces the tendency to supercool. One suitable source for the silver iodide is a copper wire having a thin coating of silver iodide on its surface. Other materials than silver iodide may be used for this purpose. These are well known in the art.

Having thus described my invention, what I desire to obtain by Letters Patent is:

1. A device for indicating that an article has undergone a freezing and subsequent thawing comprising a transparent water impervious envelope defining a cavity, said cavity containing at least one free member arranged in a predetermined relationship within said cavity and maintained in said spaced relationship by a silica gel composition which substantially fills the balance of said cavity, said gel composition characterized in that the gel structure is substantially destroyed upon freezing thereof.

2. A device for indicating that an article has undergone a freezing and subsequent thawing comprising a transparent water impervious envelope defining a cavity, said cavity containing a plurality of free members arranged to present a distinct physical form, the balance of said cavity being essentially filled with a silica gel composition, said gel characterized in that the gel structure is substantially destroyed upon freezing thereof.

3. A device in accordance with claim 2 wherein the free members have a specific gravity less than that of said silica gel.

References Cited by the Examiner
UNITED STATES PATENTS
2,750,294    6/56    Peters _____ 99—129 XR A. LOUIS MONACELL, *Primary Examiner.*